United States Patent Office 3,117,973
Patented Jan. 14, 1964

3,117,973
NOVEL THIADIAZOLE COMPOUNDS
John Malcolm Ross and William Channing Smith, Wilmington, Del., assignors to E. I. du Pont de Nemours and Company, Wilmington, Del., a corporation of Delaware
No Drawing. Filed Mar. 1, 1962, Ser. No. 176,812
1 Claim. (Cl. 260—302)

This invention relates to a new class of chemical compounds, more particularly, this invention relates to thiadiazoles and derivatives thereof. This invention further relates to a novel process for the preparation of certain of the thiadiazole compounds.

Various thiadiazole compounds are referred to in the literature as being useful as intermediates in the preparation of pharmaceuticals and some have been asserted to be useful as therapeutic agents themselves. The present invention relates to novel and useful thiadiazole compounds which can be readily prepared using inexpensive reactants.

The preparation of 3-cyano-4-hydroxy-1,2,5-thiadiazole and its potassium salt can be effected under a wide variety of conditions in which a reaction mixture of potassium cyanide and sulphur dioxide is maintained at temperatures up to 90° C. The thiadiazole compound is easily separated from the reaction mixture in a solvent extraction step in which it is crystallized from a substantially anhydrous organic solvent. A preferred method of preparing the thiadiazole compounds is carried out using an excess of $SO_2$ under autogenous pressure in the absence of a solvent followed by the solvent extraction step. Other methods of preparation include the reaction of potassium cyanide and sulfur dioxide in the presence of an organic solvent either under autogenous pressure or simply in an open vessel. However, in each instance, the practical operating temperature is between 25–90° C. and the preferred temperature is 50–75° C. After reaction the thiadiazole compounds are easily separated from the reaction mixture by crystallizing the desired compounds from a conventional organic solvent. The following examples illustrate various methods used to prepare the 3-cyano-4-hydroxy-1,2,5-thiadiazole compound and its potassium salt.

EXAMPLE I

Powdered potassium cyanide (227 g.) was charged into a 1-liter stainless steel bomb previously purged with nitrogen; the bomb was cooled, evacuated, charged with sulfur dioxide (450 g.; 100% theoretical excess), then heated with agitation at 60° C. for 4 hours. Excess sulfur dioxide was bled off from the cooled bomb and the tan-colored product (509 g.) removed and powdered through a 12-mesh sieve.

The product was transferred to a Soxhlet extraction apparatus and extracted with hot acetonitrile for 16 hours. The hot, colored extract was filtered to remove traces of insoluble inorganic material and carefully concentrated to yield the crystalline thiadiazole, contaminated with a small amount of potassium thiocyanate. Recrystallization from ethanol, involving decolorizing with activated charcoal, yielded the pure thiadiazole as a 1:1 mixture of the 3-cyano-4-hydroxy compound and its potassium salt (86.3 g.; 51% based on potassium cyanide).

*Analysis.*—Calc'd. for $C_6HN_6O_2S_2K$: C, 24.65%; H, 0.35%; N, 28.75%; S, 21.94%; K, 13.4%. Found, C, 24.77%; H, 0.57%; N, 29.09%; S, 22.05%; K, 13.5%. Molecular weight (theory 292): Found, 306.

Replacement of acetonitrile as the organic solvent by absolute ethanol yielded 3-cyano-4-hydroxy-1,2,5-thiadiazole in the form of its pure potassium salt, M.P. 307° C.

Calc'd. for $C_3N_3OSK$: C, 21.81%; N, 25.44%; S, 19.41%. Found: C, 21.29%; N, 25.09%; S, 19.65%. Molecular weight (theory 165): Found, 188.

This method is preferred for ease of operation and high yield. The preferred solvents are acetonitrile and ethanol. However, many of the common organic solvents, such as acetone, allyl alcohol, as well as acetic acid, can also be used. It is necessary that the solvent be substantially anhydrous to insure maximum yields; once isolated, the thiadiazole compounds are stable in aqueous solution.

As noted above, the preferred temperature is 50–75° C. although up to 90° C. is feasible. At temperatures above 90° C. a vigorous exothermic reaction occurs and yields of thiadiazole compounds are considerably reduced. At temperatures below 25° C. the reaction proceeds so slowly as to be impractical. In an experiment carried out at low temperatures, a reaction mixture of potassium cyanide and sulphur dioxide was maintained at −78° C. for ten days. Although a quantitative reaction occurred, solvent extraction fails to yield the thiadiazole compound or its potassium salt. Instead, an isomeric product is obtained which will yield the expected thiadiazole derivatives on hydrolysis with hydrochloric acid or sodium hydroxide.

The reaction time decreases rapidly with an increase in the reaction temperature. For instance, at about 25° C. 100 hours are required for a complete reaction, and at 75° C. only 90 minutes are necessary.

In addition to the temperature and time factors, complete reaction is dependent on the ratio of $KCN:SO_2$. Approximately equimolar amounts of KCN and $SO_2$ react and it is preferable to employ about 25% excess of $SO_2$ for complete reaction; KCN $SO_2$ ratios up to 1:2 can be used to advantage.

EXAMPLE II

A 325 ml. Hastelloy "B" shaker tube, previously purged with nitrogen, was charged with potassium cyanide (21.5 g.), freshly distilled acetonitrile (200 ml.) and sulfur dioxide (24 g.). The tube was shaken and maintained at 75° C. for 2 hours. The slight excess pressure was released from the cooled tube and the finely divided suspension of inorganic material was removed from the product by filtration.

Concentration of the red-colored acetonitrile solution gave a crystalline deposit which was collected and recrystallized from ethanol yielding the pure potassium salt of 3-cyano-4-hydroxy-1,2,5-thiadiazole (4.85 g.; 27% based on potassium cyanide).

*Analysis.*—Calc'd for $C_3N_3OSK$: C, 21.81%; N, 25.44%; S, 19.41%. Found: C, 22.18%, N, 25.32%; S, 19.59%.

This method of preparation is less preferred since it requires that the temperature be closely controlled due to the strongly exothermic reaction. However, the temperature can be advantageously controlled through the gradual addition of liquid $SO_2$ accompanied by air cooling of the reactor. Due to the high solubility of $SO_2$ in acetonitrile, it is necessary to use safety precautions during the discharge of the reaction product.

EXAMPLE III

A suspension of vacuum dried potassium cyanide (21.3 g.) in freshly distilled acetonitrile (200 ml.) was magnetically stirred in a dry flask fitted with condenser and calcium chloride guard tube. Through the suspension was bubbled a slow stream of sulfur dioxide dried by passage through concentrated sulfuric acid and through a tower of anhydrous calcium sulfate. The temperature of the reaction mixture gradually rose from room temperature to 73° C. and was accompanied by a change in color in the mixture through bright yellow to sandy-brown.

The pale-yellow suspended solid was collected and washed with acetonitrile, then ether; it was identified by its infrared spectrum as predominantly potassium pyrosulfite. The colored filtrate slowly deposited a mass of pale-yellow needles, these were collected and identified as the potassium salt of 3-cyano-4-hydroxy-1,2,5-thiadiazole.

*Analysis.*—Calc'd for $C_3N_3OSK$: C, 21.81%; N, 25.44%; S, 19.41%; K, 23.7%. Found: C, 22.19%; N, 26.07%; S, 19.58%; K, 23.5%.

On standing open to the atmosphere for a further 36 hours, the mother liquor deposited a further mass of crystals which were identified by infrared as the 1:1 mixture of the cyano-hydroxy compound and its potassium salt.

The use of acetonitrile in the reaction mixture is preferred in the methods of Examples II and III. The 1:1 mixture can be converted to 100% 3-cyano-4-hydroxy-1,2,5-thiadiazole as follows:

EXAMPLE IV

An aqueous solution of the 1:1 mixture of cyano-hydroxy compound and its potassium salt (78.1 g.) in 750 ml. water was continuously extracted with ether for 16 hours. The ether extract was removed, dried over sodium sulfate and evaporated under reduced pressure yielding light cream crystals of 3-cyano-4-hydroxy-1,2,5-thiadiazole (31.1 g.; 92% theory) identified by comparison of its infrared spectrum with an authentic sample.

An aqueous solution of the 1:1 mixture of cyano-hydroxy compound and its potassium salt (61.6 g.) in 1-liter water was acidified to pH 2 by addition of concentrated hydrochloric acid (20 ml.) and continuously extracted with ether for 18 hours. The dried ethereal extract was evaporated to dryness and the cyanohydroxy compound crystallized from ether-benzene (42.3 g.; 80%; M.P. 160–162° C.) identified by infrared comparison with an authentic sample.

The thiadiazoles made in accordance with the above methods have an oxygen function attached directly to the nucleus. This function offers the best opportunities for the introduction of other groups, such as sulfhydryl, halogen, and other substituents. The oxygen function can be replaced by a sulfur using phosphorous pentasulfide.

As prepared, the 3-cyano-4-hydroxy compounds can be used as intermediates for various 1,2,5-thiadiazoles. The below examples illustrate the ease of preparation of these various derivatives.

EXAMPLE V

*Silver Salt of 3-Cyano-4-Hydroxy-1,2,5-Thiadiazole*

A 5% aqueous solution of the thiadiazole potassium salt was treated with a slight excess of 10% aqueous silver nitrate, the fluocculent yellow-white precipitate which formed immediately in quantitative yield was collected, washed with water, ethanol and ether and air-dried.

*Lithium Salt of 3-Cyano-4-Hydroxy-1,2,5-Thiadiazole*

An aqueous solution of 3-cyano-4-hydroxy-1,2,5-thiadiazole was treated at 50° C. with small portions of powdered lithium carbonate until the pH of the solution reached 7 and gas evolution ceased. All water was removed under reduced pressure and the resultant soft mass triturated with ether. Colorless needles of the lithium salt were collected and washed with ether.

*3-Cyano-4-Methoxy-1,2,5-Thiadiazole*

A suspension of cyanohydroxythiadiazole silver salt in acetone was heated under reflux with excess methyl iodide for 12 hours. Evaporation of the filtered reaction product gave a colored residue which separated from ethanol, after charcoal treatment, as colorless rectangular prisms of 3-cyano-4-methoxy-1,2,5-thiadiazole, M.P. 47–48° C.

*3-Hydroxy-1,2,5-Thiadiazole-4-Carboxylic Acid*

The 1:1 half potassium salt mixture (29.2 g.) in 200 ml. water was treated with a solution of 28 g. potassium hydroxide in 25 ml. water and the clear solution heated under reflux for two hours. The cooled product was acidified with concentrated hydrochloric acid (60 ml.) and continuously extracted with ether for 16 hours. Ether was removed from the dried ($Na_2SO_4$) extract yielding a colorless crystalline mass, M.P. 204–205° C.

*3-Hydroxy-1,2,5-Thiadiazole-4-Carboxamide*

The 1:1 half potassium salt mixture (29.2 g.) and 28 g. potassium hydroxide in absolute ethanol (725 ml.) were heated under reflux for 3.5 hours. The crystalline potassium salt of the amide separated during the reaction and was collected from the cold reaction mixture as pale-yellow needles (35.5 g.; 96%). Acidification of an aqueous solution of the salt followed by ether extraction yielded the hydroxyamide, which crystallized from ethanol in deep yellow needles, M.P. 175–177° C.

*3-Hydroxy-1,2,5-Thiadiazole*

Sublimed hydroxycarboxylic acid (22.5 g.) was suspended in 50 ml. nitrobenzene, heated under gentle reflux in a stream of nitrogen for 2 hours, and allowed to cool. The dark-brown product was filtered and the mass of brown crystals (12.5 g.; 80%; M.P. 123–127° C.) collected and recrystallized from benzene and benzene petroleum ether yielding cream-colored needles, M.P. 128.5–130° C.

Many of the compounds of the present invention are useful as stabilizers. In particular, 3-cyano-4-hydroxy-1,2,5-thiadiazole inhibits the polymerization of acrylonitrile as shown below.

A sample of carefully purified, uninhibited acrylonitrile was purged with nitrogen and divided into two portions. To one portion was added 1% by weight of 3-cyano-4-hydroxy-1,2,5-thiadiazole; the other portion was used as a standard. The samples were exposed to direct sunlight in sealed containers. After 45 hours continuous exposure the uninhibited acrylonitrile became cloudy and considerable amounts of polymer precipitated within a further 3 hours. There were no indications of polymerization in the thiadiazole stabilized sample after 150 hours continuous exposure.

All of the compounds of the present invention are useful as intermediates in the preparation of various chemical compounds as coloring agents as illustrated by the following experiments.

The potassium salt of 3-cyano-4-hydroxy-1,2,5-thiadiazole (1.0 g.) and 5 ml. phosphorus oxychloride were mixed and stirred at room temperature for 1 hour, then heated under reflux for 30 minutes. Excess phosphorus oxychloride was removed from the cooled reaction product under reduced pressure and the solid residue extracted with benzene. Test portions of the resultant 3-cyano-4-chloro-1,2,5-thiadiazole solution were treated with the following coupling agents producing the listed colors:

(*a*) N,N-dimethylaniline—orange
(*b*) 1,1-bis-(p-dimethylaminophenyl)ethylene—purple
(*c*) Pyrrole-2-aldehyde phenylhydrazone—red
(*d*) Pyrrole—red The potassium salt of 3-hydroxy-1,2,5-thiadiazole-4-carboxamide (1.0 g.) was mixed with 5 ml. of phosphorus oxychloride and then heated under refluxing conditions for one hour in the presence of catalytic amounts of dimethylformamide. Excess phosphorous oxychloride was removed from the cooled reaction product under reduced pressure and the solid residue extracted with benzene. Test portions of the resultant 3-chloro-1,2,5-thiadiazole-4-carboxamide were then treated with the following coupling agents producing the listed colors:

(*a*) N,N-dimethylaniline—purple
(*b*) 1,1-bis(p-dimethylaminophenyl)ethylene—royal purple
(*c*) Benzaldehyde hydrazone—lemon yellow A sample of 3-hydroxy-1,2,5-thiadiazole-4-carboxylic acid was treated in the same manner with phosphorous oxychloride as described immediately above to form 3-chloro-1,2,5-thiadiazole-4-carbonyl chloride. Test portions of this compound were then treated with the following coupling agents producing the listed colors:

(a) N,N-dimethylaniline—yellow-green
(b) Benzaldehyde hydrazone—yellow-orange
(c) Furfural semicarbazone—orange-red
(d) 1,1-bis(p-dimethylaminophenyl)ethylene—light blue A sample of 3-hydroxy-1,2,5-thiadiazole was treated with phosphorous oxychloride in the same manner as shown for the potassium salt of 3-hydroxy-1,2,5-thiadiazole-4-carboxamide to form 3-chloro-1,2,5-thiadiazole. Test portions of this compound were then treated with the following coupling agents producing the listed colors:

(a) N,N-dimethylaniline—olive green
(b) Benzaldehyde hydrazone—yellow-orange
(c) 1,1-bis(p-dimethylaminophenyl)ethylene—jade green Throughout the specification, parts and percentages are by weight unless otherwise indicated.

This application is a continuation-in-part of application Serial No. 41,495, filed July 8, 1960, now Patent No. 3,068,238.

We claim:

A thiadiazole compound of the formula

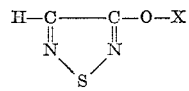

wherein X is selected from the group consisting of hydrogen, lower alkyl, and a monovalent metal.

No references cited.